United States Patent
Lehmann et al.

(10) Patent No.: US 7,351,319 B2
(45) Date of Patent: Apr. 1, 2008

(54) CATHODIC ELECTRODEPOSITION COATING COMPOSITIONS CONTAINING BISMUTH COMPOUNDS AND DICARBOXYLIC ACIDS, PRODUCTION AND USE THEREOF

(75) Inventors: Horst Lehmann, Wuppertal (DE); Klausjoerg Klein, Wuppertal (DE)

(73) Assignee: E. I. du Pont de Nemours & Co., Wilmington, DE (US)

( * ) Notice: Subject to any disclaimer, the term of this patent is extended or adjusted under 35 U.S.C. 154(b) by 874 days.

(21) Appl. No.: 10/694,471

(22) Filed: Oct. 27, 2003

(65) Prior Publication Data

US 2004/0146716 A1 Jul. 29, 2004

Related U.S. Application Data

(60) Provisional application No. 60/442,293, filed on Jan. 24, 2003.

(51) Int. Cl.
*C25D 13/10* (2006.01)
(52) U.S. Cl. ............... 204/489; 204/499; 523/415
(58) Field of Classification Search ............ 204/49, 204/499, 489; 523/415
See application file for complete search history.

(56) References Cited

U.S. PATENT DOCUMENTS

| 4,419,468 | A | 12/1983 | Lucas |
| 4,597,811 | A | 7/1986 | Ducote |
| 5,554,700 | A | 9/1996 | Schipfer et al. |
| 5,670,441 | A | 9/1997 | Foedde et al. |
| 5,702,581 | A | 12/1997 | Kerlin et al. |
| 5,908,912 | A | 6/1999 | Kollah et al. |
| 5,936,013 | A | 8/1999 | Feola et al. |
| 5,972,189 | A | 10/1999 | McMurdie et al. |
| 6,174,422 | B1 | 1/2001 | Honig et al. |
| 6,265,079 | B1 | 7/2001 | Nishiguchi et al. |

FOREIGN PATENT DOCUMENTS

| EP | 1 041 125 | 4/2000 |
| WO | WO 96/10057 | 4/1996 |
| WO | WO 00/47642 | 8/2000 |
| WO | WO 00/50522 | 8/2000 |
| WO | WO 01/51570 | 7/2001 |

OTHER PUBLICATIONS

FA1064 PCT International Search Report Mailed Jul. 21, 2004.

*Primary Examiner*—Kishor Mayekar

(57) ABSTRACT

Waterborne cathodic electrodeposition (CED) coating compositions comprising resin solids and optionally pigments, fillers and conventional coating additives, wherein said CED coating compositions comprise at least one bismuth compound in a quantity of 0.1 to 2.5 wt. %, calculated as bismuth and relative to resin solids content, together with at least one dicarboxylic acid selected from among acyclic dicarboxylic acids with 3 to 7 carbon atoms and dicarboxylic acids with 8 to 10 carbon atoms comprising a cyclic structural unit in a quantity of 3 to 15 equivalent-%, relative to the acid equivalents present in the CED coating composition.

8 Claims, No Drawings

CATHODIC ELECTRODEPOSITION COATING COMPOSITIONS CONTAINING BISMUTH COMPOUNDS AND DICARBOXYLIC ACIDS, PRODUCTION AND USE THEREOF

PRIORITY

This application claims priority from Provisional U.S. patent application Ser. No. 60/442,293, filed Jan. 24, 2003, incorporated herein by reference.

FIELD OF THE INVENTION

The invention relates to cathodic electrodeposition (CED) coating compositions containing bismuth compounds together with certain dicarboxylic acids, to the production thereof and to the use thereof in coating electrically conductive substrates by cathodic electrodeposition coating processes.

BACKGROUND OF THE INVENTION

The use of various bismuth salts as a catalyzing and/or corrosion protection constituent in lead-free CED coating agents is described repeatedly in the patent literature, for example, in U.S. Pat. Nos. 5,936,013, 5,702,581, 5,554,700, 5,908,912, 6,174,422, 5,670,441, WO 96/10057, U.S. Pat. No. 5,972,189, WO 00/50522, U.S. Pat. No. 6,265,079, EP 1 041 125, WO 00/47642, WO 01/51570.

U.S. Pat. No. 4,419,468 discloses CED coating compositions which contain 100 to 2000 ppm of polycarboxylic acids as additives for reducing or preventing discoloration caused by metal ions of the baked coatings deposited from the CED coating compositions.

None of the above-stated literature references discloses the simultaneous use of bismuth compounds and dicarboxylic acids in CED coating compositions.

It has been found that the addition of small quantities of selected dicarboxylic acids to lead-free CED coating compositions containing bismuth compounds has a catalytic action on crosslinking of coating layers deposited therefrom on baking.

SUMMARY OF THE INVENTION

The present invention accordingly provides aqueous (waterborne) CED coating agents (compositions) which contain binders, optionally together with crosslinking agents, paste resins, pigments, fillers (extenders) and/or conventional coating additives and which contain at least one bismuth compound in a quantity of 0.1 to 2.5 wt. %, calculated as bismuth and relative to resin solids content, together with at least one dicarboxylic acid selected from among acyclic dicarboxylic acids with 3 to 7 carbon atoms and dicarboxylic acids with 8 to 10 carbon atoms comprising a cyclic structural unit in a quantity of 3 to 15 equivalent %, relative to the acid equivalents present in the CED coating composition.

DETAILED DESCRIPTION OF THE EMBODIMENTS

The CED coating compositions according to the invention comprise known aqueous cathodically depositable electrodeposition coating agents which, in addition to the at least one bismuth compound, contain at least one dicarboxylic acid as an additive. Useful dicarboxylic acid additives are defined hereinafter.

The CED coating compositions are aqueous coating compositions with a solids content of for example 10 to 30 wt. %. The solids content consists of the resin solids content, of the content of bismuth compound(s) and dicarboxylic acid(s) essential to the invention, optionally present pigments and/or fillers and further non-volatile additives. The compositions do not contain lead compounds and preferably also do not contain tin compounds.

The resin solids are composed of conventional self- or externally cross-linking CED binder(s) having cationic substituents or substituents which can be converted to cationic groups, optionally, present are cross-linking agent(s) and optionally, present are other resin(s) contained in the CED coating agent, such as, paste resin(s). The cationic groups may be cationic groups or basic groups which can be converted to cationic groups, e.g., amino, ammonium, quaternary ammonium, phosphonium and/or sulfonium groups. Binders having basic groups are preferred. Nitrogen-containing basic groups, such as, amino groups are particularly preferred. These groups may be present in the quaternized form or they are converted to cationic groups with a conventional neutralizing agent, such as, amidosulfuric acid or methanesulfonic acid, lactic acid, formic acid, acetic acid. In the present invention, the conventional neutralizing agent(s) amount(s) to 85 to 97 equivalent % of the acid equivalents present in the CED coating composition, while the acid equivalents to make up to 100 equivalent % are contributed by the at least one dicarboxylic acid additive. While the at least one dicarboxylic acid is indeed not added to the CED coating composition for the purposes of neutralization and is thus also not counted as a neutralizing agent, it is not possible to prevent the at least one dicarboxylic acid from also acting as a neutralizing agent.

The cationic or basic binders may be resins containing, for example, primary, secondary and/or tertiary amino groups, the amine values of which are, e.g., 20 to 250 mg KOH/g. The weight-average molecular mass (Mw) of the CED binders is preferably 300 to 10,000. There are no restrictions on the CED binders that can be used. The various CED binders or CED binder/cross-linking agent combinations known, for example, from the extensive patent literature may be used. Examples of such CED binders include amino(meth)acrylate resins, amino epoxy resins, amino epoxy resins with terminal double bonds, amino epoxy resins with primary OH groups, amino polyurethane resins, amino group-containing polybutadiene resins or modified epoxy resin/carbon dioxide/amine reaction products. As self-crosslinking or externally cross-linking binders, these CED binders have functional groups capable of crosslinking, in particular hydroxyl groups, for example, corresponding to a hydroxyl number of 30 to 300 mg KOH/g, preferably 50 to 250 mg KOH/g. These binders may be self-crosslinking or they may be used in combination with cross-linking agents known to the skilled person. Examples of such cross-linking agents include aminoplast resins, blocked polyisocyanates, cross-linking agents with terminal double bonds, polyepoxide compounds, cross-linking agents with cyclic carbonate groups or cross-linking agents that contain groups capable of transesterification and/or transamidization. Preferred systems are those which self-crosslink or externally crosslink by reaction of groups comprising active hydrogen with blocked isocyanate groups, in particular those which crosslink by reaction of hydroxyl and/or primary and/or secondary amino groups with blocked isocyanate groups to form urethane and/or urea groups.

The CED binders may be converted to CED binder dispersions and used as such for the preparation of CED coating agents. The preparation of CED binder dispersions is known to the skilled person. For example, CED binder dispersions may be prepared by converting CED binders to an aqueous dispersion by neutralization with acid and dilution with water. The CED binders may also be present in mixture with cross-linking agents and converted together with these to an aqueous CED binder dispersion. If present, organic solvent(s) may be removed to the desired content before or after conversion to the aqueous dispersion, for example, by vacuum distillation.

In addition to the binder(s) and optionally present cross-linking agent(s), water and the at least one bismuth compound and the at least one dicarboxylic acid, the CED coating agents may also contain pigments, fillers, organic solvents and/or conventional coating additives.

Examples of pigments and fillers include the conventional inorganic and/or organic colored pigments and/or special-effect pigments and/or fillers such as, e.g., titanium dioxide, iron oxide pigments, carbon black, phthalocyanine pigments, quinacridone pigments, metallic pigments, interference pigments, kaolin, talc, silica. The pigment plus filler/resin solids weight ratio of the CED coating agents is, for example, from 0:1 to 0.8:1, and for pigmented coating agents it is preferably from 0.05:1 to 0.4:1.

Examples of organic solvents which may be used in the ready-to-apply CED coating bath in amounts of, for example, up to 5 wt. % include polar aprotic water-miscible solvents such as, N-methylpyrrolidone, dimethyl sulfoxide, dimethyl formamide, sulfolane; alcohols, such as, cyclohexanol, 2-ethylhexanol, butanol; glycol ethers, such as, methoxypropanol, ethoxypropanol, butoxyethanol, diethylene glycol diethyl ether; ketones, such as, methyl isobutyl ketone, methyl ethyl ketone, cyclohexanone; hydrocarbons.

Examples of conventional coating additives which may be used in the CED coating agents in amounts of, for example, 0.1 wt. % to 5 wt. %, based on the resin solids, include wetting agents, neutralizing agents, anti-crater agents, leveling agents, antifoaming agents, light stabilizers and antioxidants.

The CED coating compositions according to the invention contain as additive at least one bismuth compound, for example, a bismuth chelate complex, bismuth oxide, bismuth hydroxide, a bismuth salt, such as, bismuth nitrate, bismuth acetate, bismuth methoxyacetate, a bismuth salt of an aminocarboxylic acid or in particular a bismuth salt of a hydroxycarboxylic acid or sulfonic acid. Preferred examples of the latter bismuth salts are aliphatic hydroxycarboxylic acid salts of bismuth, such as, bismuth lactate, bismuth dimethylolpropionate, bismuth amidosulfonate and bismuth hydrocarbylsulfonates, among the latter in particular bismuth alkylsulfonates, especially bismuth methanesulfonate.

The proportion of the at least one bismuth compound added to the CED coating composition is 0.1 to 2.5 wt. %, preferably 0.5 to 2 wt. %, calculated as bismuth and relative to the resin solids content of the CED coating composition.

In addition to the at least one bismuth compound, the CED coating compositions according to the invention contain at least one dicarboxylic acid selected from among acyclic dicarboxylic acids with 3 to 7 carbon atoms and dicarboxylic acids with 8 to 10 carbon atoms comprising a cyclic structural unit as an additional additive.

In addition to the two carboxyl groups, the dicarboxylic acids may contain one or more further substituents, but preferably the residue joining the two carboxyl groups is a hydrocarbon residue which comprises no further substituents or functional groups.

In the case of acyclic dicarboxylic acids with 5 to 7 carbon atoms, the residue joining the two carboxyl groups may be linear or branched. In the case of dicarboxylic acids with 8 to 10 carbon atoms comprising a cyclic structural unit, preferably a cyclic hydrocarbon structure, the carboxyl groups may be attached to the cyclic structure directly and/or via a non-cyclic hydrocarbon residue. The cyclic structure may comprise a four-, five- or in particular six-membered ring, which may be substituted with appropriate alkyl groups.

Examples of acyclic dicarboxylic acids with 3 to 7 carbon atoms also comprise, in addition to unbranched types, such as, malonic acid, succinic acid, maleic acid, fumaric acid, glutaric acid, adipic acid, pimelic acid, types comprising branches such as methylmalonic acid, dimethylmalonic acid, methylsuccinic acid, dimethylglutaric acid.

Examples of dicarboxylic acids with 8 to 10 carbon atoms comprising a cyclic structural unit are cyclic dicarboxylic acids with carboxyl groups directly attached to the ring, such as, in particular the isomeric cyclohexanedicarboxylic acids, tetrahydrophthalic acid, phthalic acid or also those comprising additional alkyl substituents on the ring, such as, the isomeric methylcyclohexanedicarboxylic acids.

Dicarboxylic acids preferred for the purposes of the invention are dicarboxylic acids with water-solubility at 20° C. of at least 1 gram per liter of water. Maleic acid and dimethylglutaric acid are the particularly preferred dicarboxylic acids.

The proportion of the at least one dicarboxylic acid added to the CED coating composition is 3 to 15 equivalent %, relative to the acid equivalents contained in the CED coating composition. 100 equivalent % as the sum of the contributions from acid conventionally present as neutralizing agent and from dicarboxylic acid(s) here corresponds to an acid content of the order of magnitude conventional for CED coating compositions of for example 20 to 70 milliequivalents of acid per 100 g of resin solids content.

The at least one bismuth compound as well as the at least one dicarboxylic acid may be added to the CED coating agent by various methods and in each case at the same or different points during the production of the CED coating agents. For example, the at least one bismuth compound may be added to an optionally already neutralized CED binder or an optionally already neutralized CED binder solution before the addition of substantial quantities of water and then be homogenized by stirring. When appropriate acids are used as neutralizing agents for the binder, it is possible with bismuth oxide, bismuth hydroxide or bismuth carbonate to form a bismuth salt, for example, bismuth lactate or bismuth methanesulfonate, in situ; in this case, it is advantageous to use an appropriately adjusted, increased quantity of acid relative to the quantity of acid required to neutralize the CED binder. The at least one dicarboxylic acid may also be added to an optionally already neutralized CED binder or an optionally already neutralized CED binder solution before the addition of substantial quantities of water.

It is also possible to add the at least one bismuth compound and/or the at least one dicarboxylic acid to the finished aqueous CED binder dispersion or to the finished, ready-to-apply CED coating composition. The at least one bismuth compound and/or the at least one dicarboxylic acid can, for example, be added as such or as an aqueous or organic composition, for example, solution.

Irrespective of whether the CED coating agents are pigmented or unpigmented, they may be prepared by known methods for the preparation of CED coating baths, i.e., in principle both by means of the one-component and the two-component procedure.

In the case of the one-component procedure for the preparation of pigmented CED coating agents, one-component concentrates are prepared by dispersing and optionally grinding pigments and/or fillers in CED binder optionally containing crosslinker, for example, in an organic solution of a CED binder or of a paste resin, optionally, followed by the addition of further make-up CED binder to the mill base. The CED coating agent or bath may then be prepared from this material by dilution with water after the addition of acid as neutralizing agent—unless this has already been carried out. In the case of solids compensation of the CED coating bath, unlike the fresh preparation of a CED coating bath, mixing is carried out not with water but with CED coating bath contents depleted of solids due to CED coating. The addition, which is essential to the invention, of at least one bismuth compound and of at least one dicarboxylic acid may here be carried out at any desired point or using any of the methods of addition described above.

Un-pigmented CED coating agents may be prepared in a similar manner by the one-component procedure in which case the addition and dispersion of pigments or fillers is, by definition, left out.

In the two-component procedure for the preparation of pigmented or un-pigmented CED coating agents, (a) at least one CED binder dispersion is mixed as one component with (b) at least one additional, optionally pigmented (optionally containing pigments and/or fillers) component to obtain a CED coating agent, with the additional possibility of adding water to adjust the solids. A pigmented component (b) is, in particular, a pigment and/or filler paste (b1). Pigment and/or filler pastes (b1) may be prepared in the usual manner by dispersing and optionally grinding pigments and/or fillers in CED binders, preferably in conventional paste resins known to the skilled person. Examples of unpigmented components (b) include additive preparations (b2), for example, aqueous or organic solutions, aqueous emulsions or aqueous or organic suspensions of additives. The at least one bismuth compound and the at least one dicarboxylic acid may be a constituent of the CED binder dispersion (a) and/or of a pigment and/or filler paste (b1) and/or of an additive preparation (b2). A CED binder dispersion (a) containing at least one bismuth compound and/or at least one dicarboxylic acid may be produced by adding the at least one bismuth compound and/or the at least one dicarboxylic acid, for example, to a CED binder present in a non-aqueous phase and, after addition of acid as neutralizing agent provided that this has not already been performed, converting the at least one bismuth compound and/or the at least one dicarboxylic acid together with said binder into a corresponding CED binder dispersion (a) by dilution with water. A pigment and/or filler paste (b1) containing at least one bismuth compound and/or at least one dicarboxylic acid may, for example, be produced by dispersing and optionally grinding pigments and/or fillers together with the at least one bismuth compound and/or the at least one dicarboxylic acid in CED binder or paste resin or by mixing a CED binder containing at least one bismuth compound and/or at least one dicarboxylic acid with a previously produced pigment paste. The additive preparations (b2), which may contain at least one bismuth compound and/or at least one dicarboxylic acid as the only additive(s) or together with at least one other conventional coating additive, may comprise appropriate aqueous or organic preparations, for example emulsions, suspensions or solutions.

In the case of solids compensation, unlike the fresh preparation of a CED coating bath, the components (a) and (b) are not diluted with water but mixed with CED coating bath contents depleted in solids due to CED coating.

CED coating layers, for example, in a dry layer thickness of 10 µm to 30 µm, may be deposited in the usual way from the CED coating agents onto electrically conductive, particularly, metallic substrates connected up as the cathode.

Metal substrates used may be parts made of all conventional metals, for example, the metal parts usually used in the automotive industry, particularly automotive bodies and parts thereof. Examples include components of aluminum, magnesium or alloys thereof and, in particular, galvanized or non-galvanized steel. Before CED coating, the metal substrates may undergo a conversion treatment, for example, they may be, in particular, phosphated and optionally, passivated.

Corrosion protection of primers deposited on, for example, steel, from the CED coating agents according to the invention is also outstanding on bright steel or on merely phosphated non-passivated steel. The various substrates may be present together on one workpiece (mixed construction). Similarly, metal parts, which have already been partially or wholly pre-coated, or plastic parts, may be present on the workpiece.

After coating with the CED coating agent according to the invention, the CED coating is cross-linked (cured) by baking, e.g., at object temperatures from 130° C. to 200° C. The CED coating layers may be unbaked or, after baking, provided with one or more further coating layers, for example, a top coat layer or a multi-layer coating comprising, for example, a surfacer layer, base coat layer and clear coat layer.

Irrespective of the baking temperature selected in the particular case, the CED coating compositions according to the invention exhibit a higher curing speed or a lower minimum baking temperature than do CED coating compositions which are of identical composition except for the added dicarboxylic acid. This makes it possible for the user to reduce the baking temperature or, if the same baking temperature is used, the user has a greater certainty that a high level of curing will occur. In the case of underbaking conditions, for example, if solid parts do not reach the nominally required object temperature within the time available for baking or do not reach it for the full time, the coating composition will have an acceptable level of cure.

EXAMPLES

Example 1

(Production of Bismuth Hydroxycarboxylic Acid Salts)

Deionized water and hydroxycarboxylic acid were initially introduced and heated to 70° C. Bismuth oxide ($Bi_2O_3$) was added in portions while the mixture was stirred. After an additional 6 hours of stirring at 70° C., the batch was cooled to approximately 20° C. and left to stand unstirred for 12 hours. Finally, the precipitate was filtered out, washed with a little water and ethanol and dried at a temperature of 40 to 60° C.

The following salts were produced using the stated proportions:

Bismuth Lactate
466 parts (1 mol) of bismuth oxide+901 parts (7 mol) of lactic acid, 70% in water Bismuth Dimethylolpropionate:
466 parts (1 mol) of bismuth oxide+938 parts (7 mol) of dimethylolpropionic acid+2154 parts of water Example 2

(Production of Bismuth Methanesulfonate)

A mixture of 296 g of deionized water and 576 g (6 mol) of methanesulfonic acid was initially introduced and heated to 80° C. 466 g (1 mol) of bismuth oxide ($Bi_2O_3$) were added in portions while the mixture was stirred. After 3 hours, a turbid liquid is obtained which, on dilution with 5400 g of deionized water, gives rise to an opalescent solution. The residue left on evaporation of the solution is bismuth methanesulfonate.

Example 3

(Preparation of CED Coating Dispersions)

a) 832 parts of the monocarbonate of an epoxy resin based on bisphenol A (commercial product Epikote® 828) were mixed with 830 parts of a commercial polycaprolactone polyol (commercial product CAPA 205) and 712 parts of diglycol dimethylether and reacted at 70° C. to 140° C. with 0.3% $BF_3$-etherate as catalyst until an epoxy value of 0 was obtained. In the presence of 0.3% Zn acetyl acetonate as catalyst, 307 parts of a reaction product of 174 parts of toluene diisocyanate and 137 parts of 2-ethyl hexanol were added to this product at 40° C. to 80° C. with the addition of 0.3% benzyl trimethylammonium hydroxide. The reaction was continued until an NCO value of about 0 was obtained and the mixture then adjusted to a solids content of 70 wt. % with diglycol dimethyl ether.

b) 618 parts of a reaction product of 348 parts of toluene diisocyanate and 274 parts of 2-ethyl hexanol were added slowly to 1759 parts of a biscarbonate of an epoxy resin based on bisphenol A (commercial product Epikote® 1001) at 60° C. to 80° C. with the addition of 0.3% benzyl trimethylammonium hydroxide. The reaction was continued to an NCO value of about 0.

c) At a temperature of 20° C. to 40° C., 622 parts of the reaction product of 137 parts of 2-ethylhexanol with 174 parts of toluene diisocyanate with benzyltrimethylammonium hydroxide catalysis (0.3%) were added to 860 parts of bishexamethylene triamine dissolved in 2315 parts of methoxy propanol and the reaction was continued until an NCO content of about 0 was obtained. Then 4737 parts of the reaction product b) and 3246 parts of the reaction product a) (in each case 70% in diglycol dimethyl ether) were added and reacted at 60° C. to 90° C. The reaction was ended at an amine value of about 32 mg KOH/g. The product obtained was distilled under vacuum to a solids content of about 85%.

d1) Neutralization was carried out with 30 mmole of formic acid/100 g of resin. The mixture was then heated to 70° C. and bismuth lactate (from Example 1) was added in portions, with stirring, over a period of two hours, in an amount such that 1 wt. % of bismuth, based on resin solids content, was present in the mix. Stirring was then continued for another 6 hours at 60° C. to 70° C. After cooling, the mixture was converted with deionized water to a dispersion with a solids content of 40 wt. %.

d2) The same method was used as described in d1), except that bismuth methanesulfonate (from Example 2) was used instead of bismuth lactate.

Comparative Example 4a (Production of a CED Clear Coat Containing Bismuth Lactate)

815.5 parts of the dispersion from Example 3 d1) were adjusted with 50 wt-% aqueous formic acid to a meq value of 45 mmol of acid/100 g of solids and diluted to a solids content of 15 wt-% with deionized water.

Comparative Example 4b (Production of a CED Clear Coat Containing Bismuth Methanesulfonate)

815.5 parts of the dispersion from Example 3 d2) were adjusted with 50 wt-% aqueous formic acid to an meq value of 45 mmol of acid/100 g of solids and diluted to a solids content of 15 wt-% with deionized water.

Example 4c, According to the Invention (Production of a CED Clear Coat Containing Bismuth Lactate and Dimethylglutaric Acid)

The same method was used as in Example 4a, wherein an meq value of only 42 mmol of acid/100 g of solids was established with formic acid and, prior to dilution to a solids content of 15 wt. %, 3 milliequivalents of acid/100 g of solids were added in the form of an aqueous solution of dimethylglutaric acid.

Examples 4 d-f, According to the Invention (Production of CED Clear Coats Containing Bismuth Methanesulfonate and Dicarboxylic Acid)

The same method was used as in Example 4b, wherein an meq value of only 42 mmol of acid/100 g of solids was established with formic acid and, prior to dilution to a solids content of 15 wt. %, 3 milliequivalents of acid/100 g of solids were added in the form of dicarboxylic acid dissolved in water. In the case of phthalic acid, a phthalic acid solution in a 1:1 mixture of ethylene glycol monobutyl ether and water was used.

Degreased, unphosphated steel test panels were provided with 20 μm thick CED coating layers from CED clear coat baths 4a-f (coating conditions: 2 minutes at 32° C. at a deposition voltage of 260 V) and baked at various object temperatures for 20 minutes in each case and the completeness of crosslinking was investigated by acetone resistance testing. To this end, a cotton wool swab soaked with acetone was placed on the baked CED coating and covered with a watch glass. After different periods of acetone exposure, the watch glass and cotton wool swab were removed and, after 30 seconds (to allow acetone residues to volatilize), tested by scratching with a horn spatula to determine whether softening had occurred (not OK) or whether the coating was unchanged (OK). Table 1 shows the periods of exposure to acetone determined in this manner which are required to bring about negative impairment of the baked CED coating layers. Values of >180 seconds indicate proper crosslinking, as no change in the CED coating layer could be determined even after exposure to acetone lasting for more than 180 seconds.

TABLE 1

| CED clear coat | Added dicarboxylic acid | Acetone resistance after crosslinking at | | |
|---|---|---|---|---|
| | | 160° C.[1] | 170° C.[1] | 180° C.[1] |
| 4a (Comparison) | ./. | 60 | 120 | >180 |
| 4b (Comparison) | ./. | 120 | 150 | >180 |
| 4c | Dimethylglutaric acid | 90 | 150 | >180 |
| 4d | Dimethylglutaric acid | >180 | >180 | >180 |
| 4e | Maleic acid | 150 | >180 | >180 |
| 4f | Phthalic acid | 120 | >180 | >180 |

[1] The values stated are the periods of exposure to acetone in seconds required to soften or alter the CED coating layer as a function of the selected baking temperature (160° C., 170° C. or 180° C.).

Example 4c, according to the invention, on comparison with Example 4a as well as Examples 4d to 4f, according to the invention, on comparison with Example 4b show that the addition of the dicarboxylic acid has a catalytic effect on the baking crosslinking.

What is claimed is:

1. Waterborne cathodic electrodeposition (CED) coating compositions comprising resin solids and optionally pigments, fillers and conventional coating additives, wherein said CED coating compositions comprise at least one bismuth compound in a quantity of 0.1 to 2.5 wt. %, calculated as bismuth and relative to resin solids content, together with at least one dicarboxylic acid in a quantity of 3 to 15 equivalent %, relative to 100 equivalent % of acid present in the CED coating composition, wherein the at least one dicarboxylic acid is selected from the group consisting of acyclic dicarboxylic acids with 3 to 7 carbon atoms and dicarboxylic acids with 8 to 10 carbon atoms comprising a cyclic structural unit.

2. The CED coating compositions of claim 1, wherein the proportion of the at least one bismuth compound is 0.5 to 2 wt. %, calculated as bismuth and relative to resin solids content.

3. The CED coating compositions of claim 1, wherein the at least one bismuth compound is selected from the group consisting of bismuth chelate complexes, bismuth oxide, bismuth hydroxide and bismuth salts.

4. The CED coating compositions of claim 1, wherein the at least one bismuth compound is selected from the group consisting of bismuth lactate, bismuth dimethylolpropionate, bismuth amidosulfonate and bismuth hydrocarbylsulfonates.

5. The CED coating compositions of claim 1, wherein 100 equivalent % of acid present in the CED coating composition is equal to 20 to 70 milliequivalents of acid per 100 g of resin solids content.

6. The CED coating compositions of claim 1, wherein the resin solids content comprises a system which self-crosslinks or externally crosslinks by reaction of groups comprising active hydrogen with blocked isocyanate groups.

7. A process comprising cathodic electrodepositing a coating of the CED coating composition according to claim 1 on an electrically conductive substrate.

8. A process according to claim 7, wherein the substrate comprises a substrate selected from the group consisting of automotive bodies and body parts.

* * * * *